(12) United States Patent
Yashiro et al.

(10) Patent No.: US 6,521,677 B2
(45) Date of Patent: Feb. 18, 2003

(54) RADIATION-CURABLE METAL PARTICLES AND CURABLE RESIN COMPOSITIONS COMPRISING THESE PARTICLES

(75) Inventors: Takao Yashiro, Tsuchiura (JP); Yuichi Eriyama, Tsukuba (JP); Isao Nishikawi, Toride (JP); Takashi Ukachi, Ushiku (JP)

(73) Assignees: DSM N.V., Heerlen (NL); JSR Corporation, Tokyo (JP); Japan Fine Coating Co., Ltd., Tokyo (JP)

( * ) Notice: Subject to any disclaimer, the term of this patent is extended or adjusted under 35 U.S.C. 154(b) by 0 days.

(21) Appl. No.: 09/849,619

(22) Filed: May 7, 2001

(65) Prior Publication Data

US 2002/0019461 A1 Feb. 14, 2002

Related U.S. Application Data

(63) Continuation of application No. PCT/NL99/00678, filed on Nov. 4, 1999.

(30) Foreign Application Priority Data

Nov. 6, 1998 (JP) .......................................... 10-316144

(51) Int. Cl.$^7$ ................................................ C08K 9/06
(52) U.S. Cl. ...................... 523/212; 524/439; 524/440; 524/441
(58) Field of Search .......................... 523/212; 524/439, 524/440, 441

(56) References Cited

U.S. PATENT DOCUMENTS

| | | | |
|---|---|---|---|
| 4,167,423 A | | 9/1979 | Williams |
| 4,169,912 A | | 10/1979 | Ambros et al. |
| 4,213,886 A | | 7/1980 | Turner |
| 4,624,971 A | | 11/1986 | Van Tao Nguyen et al. |
| 4,778,834 A | | 10/1988 | Murray |
| 5,013,523 A | * | 5/1991 | Hata ........................... 419/19 |
| 5,277,980 A | | 1/1994 | Mino |
| 5,494,949 A | | 2/1996 | Kinkel et al. |
| 5,618,872 A | | 4/1997 | Pohl et al. |
| 6,270,884 B1 | * | 8/2001 | Guhde ........................ 428/323 |

* cited by examiner

*Primary Examiner*—Edward J. Cain
(74) *Attorney, Agent, or Firm*—Pillsbury Winthrop LLP

(57) ABSTRACT

Provided is a liquid curable resin composition which can produce transparent cured products with a high refractive index, high hardness, and superior abrasion resistance, and which can be suitably used as a coating material. The liquid curable resin composition comprises: (A) a poly-functional (meth)acrylic compound having at least three (meth) acryloyl groups in the molecule; (B) a reaction product obtained by the reaction of a compound having a polymerizable unsaturated group and alkoxysilyl group in the molecule and particles metal oxide, the metals being preferably selected from the group consisting of zirconium, antimony, zinc, tin, cerium, and titanium; and (C) a radiation polymerization initiator.

15 Claims, No Drawings

RADIATION-CURABLE METAL PARTICLES AND CURABLE RESIN COMPOSITIONS COMPRISING THESE PARTICLES

This is a continuation of International Application No. PCT/NL99/00678 filed Nov. 4, 1999 which designates the U.S., and that International Application was published under PCT Article 21(2) in English.

FIELD OF THE INVENTION

The present invention relates to radiation-curable metal particles comprising a radiation-curable group linked by a silyl group to a metal and, to a liquid curable resin composition comprising a poly-functional (meth)acrylic compound and these metal oxide particles. More particularly, the present invention relates to a liquid curable resin composition which can produce cured products with a high refractive index by application to fabricated plastic articles or films and can also produce anti-reflection films.

BACKGROUND OF INVENTION

Conventionally, a hard coat treatment has been applied as means for protecting surfaces of fabricated plastic materials such as plastic optical parts, touch panels, and film-type liquid crystal elements, as well as coated surfaces such as floors and walls inside buildings. UV curable acrylic-type hard coat materials such as polyester acrylate, urethane acrylate, and epoxy acrylate have been used as such hard coat materials. When used alone, however, these hard coat materials could not sufficiently improve mar resistance, slip characteristics, and stain resistance of the above-mentioned plastic surfaces and coated surfaces.

A method of adding inorganic fillers such as silica or organic fillers such as polyethylene powder and polycarbonate powder and a method of adding additives such as silicone are well known as the method for improving mar resistance, slip characteristics, and stain resistance of fabricated plastic surfaces.

However, the method of adding inorganic or organic fillers has drawbacks such as an increased haze value and impaired appearance of resulting coating films. The method of adding silicone can improve slip characteristics of coating surfaces, but not mar resistance due to abrasive wheels. In addition, a hard coat applied to a touch panel or the like requires an after-treatment step with alkali etching. This may involve hydrolysis of commonly used silicone additives with alkali, resulting in impaired appearance of coatings or peeling of coatings from fabricated plastic materials.

With regard to a thermosetting resin material with a high refractive index, Japanese Patent Pubication No. 12489/1990 discloses a high refractive index resin used for lenses. The resin comprises a polymer obtained by the reaction of a vinyl compound and an urethanized (meth)acrylic monomer which is obtained by the reaction of a (meth)acrylic monomer having a halogen substituted aromatic ring and a polyfunctional isocyanate compound. Although the resin has a high refractive index, its abrasion resistance is insufficient.

On the other hand, with regard to a photopolymerizable cross-linking coating materials, Japanese Patent Application Laid-open No. 169833/1987 discloses a photocurable monomer comprising polyacrylate of dipentaerythritol. Coatings with sufficient hardness can be obtained in a short period of time using this monomer. However, because the coatings have a refractive index of 1.55 or less, the monomer may produce interference stripes if coated over the substrate with a high refractive index such as polycarbonate, polyester carbonate, polyethylene terephthalate, or poly-1,4-cyclohexane dimethylane terephthalate. Thus, this material is inadequate for use with optical products requiring high resolution.

PROBLEMS TO BE SOLVED BY THE INVENTION

An object of the present invention is to provide a liquid curable resin composition which can produce transparent cured products with a high refractive index, high hardness, and superior abrasion resistance, and can be suitably used as a coating material.

Another object of the present invention is to provide a liquid curable resin composition suitable for producing a hard coat over the surface of fabricated plastic materials.

Other objects and features of the present invention will become apparent from the following detailed description of the present invention.

SUMMARY OF THE INVENTION

The present invention provides radiation-curable metal particles comprising a radiation-curable group linked by a silyl group to a metal, in particular where said metal is not inclusive of silicon metal Also provided are methods to prepare such particles.

In addition, the present invention provides compositions that comprise the above-noted particles. Preferred compositions provided by the present invention are compositions that, after radiation cure, provide products of high transparency, low haze, and a refractive index of more than 1.55.

Furthermore, the present invention provides articles made by curing the above compositions, including articles comprising coatings and films formed from such compositions. In particular articles having antireflection properties are provided.

DETAILED DESCRIPTION OF THE INVENTION

Herein certain terms are used to define certain chemical aspects. These terms are defined below.

A (meth)acrylic compound is a compound comprising a (meth)acryloyl group, whereby it is noted that a (meth)acrylol group, by definition, comprises an unsaturated bond.

When reference is made to groups in the periodic table of elements, reference is made to the periodic table appearing on the inside front cover of "CRC Handbook of Chemistry and Physics", 78th ed. 1997–1998, and to the "New Notation" noted thereon.

Consequently, the groups are numbered in arabic notation, for example group 11 is the group consisting of copper, silver and gold, group 2 is the group that includes magnesium, calcium and barium etc. Furthermore, in this application, group 3 is considered to include elements 57–71 and elements 89–103, i.e. the lanthanides and actinides.

The present invention provides a radiation-curable metal particle comprising a radiation-curable group linked by a silyl group to a metal, which hereinafter will also be referred to as "component B". It will be appreciated by one of ordinary skill in the art that "component B" may refer to a single particle, multiple particles, or a mixture of particles.

The present invention further provides compositions comprising these particles. Such radiation-curable compositions may be any suitable radiation-curable composition, and may further comprise a (meth)acrylic compound (hereinafter also referred to as "component (A)"). The composition may, independent of the presence of component (A), also comprise a radiation polymerization initiator (hereinafter also referred to as "component (C)").

Component (A) can be any suitable (meth)acrylic compound. Preferably, component(A) comprises at least three (meth)acryloyl groups in the molecule, more preferably from 3 to 10 (meth)acryloyl groups, even more preferably from 4 to 10 (meth)acryloyl groups, and most preferably from 4 to 8 (meth)acryloyl groups.

Given as examples of such a (meth)acrylic compound are trimethylolpropane tri(meth)acrylate, trimethylolpropane trioxyethyl (meth)acrylate, tris(2-hydroxyethyl) isocyanurate tri(meth)acrylate, pentaerythritol tri(meth)acrylate, pentaerythritol tetra(meth)acrylate, dipentaerythritol hexa(meth)acrylate, and the like.

As examples of commercially available products of the (meth)acrylic compound having at least three (meth)acryloyl groups in the molecule, Kayarad DPHA, DPCA-20, DPCA-30, DPCA-60, DPCA-1 20, D-310, D-330, PET-30, GPO-303, TMPTA, THE-330, TPA-330 (manufactured by Nippon Kayaku Co., Ltd.), Aronix M-315, M-325 (manufactured by Toagosei Co., Ltd.), and the like can be given.

The proportion of the (meth)acrylic compound having at least three (meth)acryloyl groups in the molecule used as the component (A) in the composition of the present invention is in the range preferably from 1 to 99 wt %, more preferably from 10 to 90 wt %, and particularly preferably from 30 to 70 wt %. The number of (meth)acryloyl groups in the molecule is preferably from 4 to 10, and more preferably from 4 to 8.

The particles of component (B) comprise a radiation-curable group linked by a silyl group to a metal. The metal can be any suitable metal, and is preferably a metal selected from the metals listed in groups 2–16 from the periodic table of elements exclusive of silicon metal. Preferably the metal is selected from the metals listed in groups 3–4 and 12–15 from the periodic table of elements (exclusive of silicon metal). In particular it is preferred that the metal is selected from the group consisting of zirconium, titanium, antimony, zinc, tin, indium, cerium and aluminium, and most preferably the metal is selected from the group consisting of zirconium, antimony, zinc and cerium.

The silyl group is preferably a substituted silyl group. The substituted silyl group may be any suitable silyl group. Preferably, the substituted silyl group comprises a urethane group, a thiorethane group and/or an alkoxy group. Preferably, the silyl group comprises at least a urethane group.

The silyl group may be derived from compounds having at least one alkoxysilyl group and mercapto group in the molecule, as noted herein below, and such compounds reacted with the isocyanates noted herein below.

In a composition that comprises both component (A) and component (B), the proportion of component (B) is preferably from 1 to 99 wt %, more preferably from 10 to 90 wt %, and particularly preferably from 30 to 70 wt %, relative to the total weight of the composition.

When component (B) is a mixture of particle 5, preferably at least 90 wt %, more preferably at least 95%, and most preferably at least 99 wt % of the total metals (excluding the silicon in the silyl group) in component (B) is selected from the group consisting of zirconium, titanium, antimony, zinc, tin, indium, cerium and aluminium.

Component (B) may be a reaction product.

The reaction product used as the component (B) is obtained by the reaction of an organosilicon compound having a polymerizable unsaturated group and alkoxysilyl group in the molecule and metal oxide particles, wherein the major components of metal oxide particles are oxide of metals selected from the group consisting of zirconium, titanium, antimony, zinc, tin, indium, cerium, and aluminum. The proportion of the reaction product contained in the composition of the present invention as the component (B) is preferably from 1 to 99 wt %, more preferably from 10 to 90 wt %, and particularly preferably from 30 to 70 wt %. The reaction is carried out preferably in the presence of water.

The reaction product used as the component (B) in the present invention can be prepared by a method including at least an operation of mixing the organosilicon compound and metal particles. The amount of residual organosilicon compounds immobilized on metal oxide particles is preferably 0.01 wt % or more, more preferably 0.1 wt % or more, and most preferably 1 wt % or more. If the amount of residual organosilicon compounds immobilized on metal oxide particles is less than 0.01 wt %, dispersibility of the reaction product containing metal oxide particles in the composition of the present invention may be insufficient, which may result in lack of transparency and abrasion resistance of the composition. The proportion of organosilicon compounds in the raw material composition to produce the component (B) is preferably 10 wt % or more, and more preferably 30 wt % or more. If proportion of organosilicon compounds is less than 10 wt %, film-forming capability of the resulting composition may be poor. The proportion of metal oxide particles in the raw material composition for the component (B) is preferably 50 wt % or less, and more preferably 20 wt % or less. Dispersibility, transparency, and abrasion resistance of the resulting composition may be insufficient, if the amount of the metal oxide particles in the raw material composition for preparing component (B) is more than 50 wt %.

Preferably the organosilicon compound possesses a polymerizable unsaturated group and alkoxysilyl group in the molecule. As preferable examples of the polymerizable unsaturated group, acrylic group, vinyl group, and styryl group can be given. As an alkoxysilyl group, the group which can be hydrolyzed in the presence of water or a hydrolysis catalyst is desirable. In addition, the organosilicon compound may contain at least one bond selected from an ester group, ether group, urethane group, sulfide group, and thiourethane group in the molecule. The organosilicon compound preferably comprises at least one polymerizable unsaturated group, urethane bond group, and alkoxysilyl group as its constituents. The alkoxysilyl group is the component which combines with adsorption water existing on the surface of metal oxide particles by a hydrolysis-condensation reaction. The polymerizable unsaturated group is the component of which the molecules chemically cross-link among themselves by an addition polymerization reaction in the presence of reactive radicals. The urethane bond group is a constitutional unit which bonds the molecules having an alkoxysilyl group and the molecules having a polymerizable unsaturated group directly or via other molecules. At the same time, the urethane bond group creates a moderate cohesive force among molecules due to hydrogen bonds, thereby providing the cured products made from the composition of the present invention with excellent mechanical strength, superior adhesion with substrates, high heat resistance, and the like.

As examples of preferable organosilicon compounds, the compounds shown by the following formula (1) can be given.

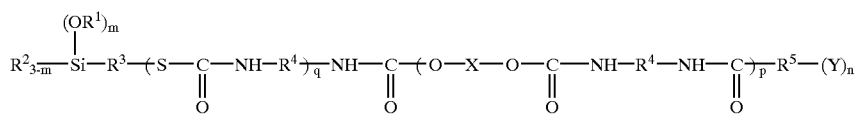

(1)

wherein $R^1$ is a hydrogen atom or a mono-valent organic group having from 1 to 8 carbon atoms, such as methyl, ethyl, propyl, butyl, phenyl, or octyl group; $R^2$ is a hydrogen atom or an alkyl group having from 1 to 3 carbon atoms; and m is 1, 2 or 3. As examples of trimethoxysily groups represented by the formula, $(RO^1)_m R^2_{3-m} Si$, triethoxysilyl group, triphenoxysilyl group, methyldimethoxysilyl group, dimethylmethoxysilyl group, and the like can be given, with preferred groups being trimethoxysilyl group and triethoxysilyl group. A structural unit represented by the formula, —(C=O)NH—$R^4$—NH(C=O)O—X—$O_p$—, is introduced to extend the molecular chain into the structure shown by the above-mentioned formula (1). $R^3$ is a divalent organic group having from 1 to 3 carbon atoms. $R^4$, which may be either the same with or different from $R^3$, is a divalent organic group and selected from divalent organic groups with a molecular weight from 14 to 10,000, preferably from 78 to 1,000, for example, a linear polyalkylene group such as methylene, ethylene, propylene, hexamethylene, octamethylene, and dodecamethylene groups; alicyclic or polycyclic divalent organic groups such as cyclohexylene and norbornylene groups; divalent aromatic groups such as phenylene, naphthylene, biphenylene, and polyphenylene groups; and alkyl group or aryl group substitution products of these groups. These divalent organic groups may further contain atomic groups containing elements other than carbon atoms and hydrogen atoms, p and q in the above formula are 0 or 1. X is a divalent organic group, and more particularly, a divalent organic group originating from the compound having an active hydrogen atom which can react with an isocyanate group in the molecule by the addition reaction. Given as examples are divalent organic groups obtained by removing two active hydrogen atoms from the compound such as a polyalkylene glycol, polyalkylene thioglycol, polyester, polyamide, polycarbonate, polyalkylene diamine, polyalkylene dicarboxylic acid, polyalkylene diol, or polyalkylene dimercaptan. $R^5$ is an organic group with a valency of (n+1). Such an organic group is preferably selected from linear, branched, or cyclic saturated hydrocarbon groups, unsaturated hydrocarbon groups, and alicyclic groups. Y in the above formula represents a mono-valent organic group having a polymerizable unsaturated group which causes a cross-linking reaction to occur among the molecules in the presence of reactive radicals, such as, for example, acryloxy group, methacryloxy group, vinyl group, propenyl group, butadienyl group, styryl group, ethynyl group, cinnamoyl group, maleate group, acrylamide group, and the like. Among these, acryloxy group is desirable. n is a positive integer preferably from 1 to 20, and more preferably from 1 to 10, and particularly preferably from 3 to 5.

The organosilicon compound used in the present invention can be prepared, for example, by (1) an addition reaction of an alkoxysilane having a mercapto group (i.e. a mercaptoalkoxysilane), a polyisocyanate compound, and an active hydrogen group-containing polymerizable unsaturated compound which possesses an active hydrogen which can cause an addition reaction to occur with an isocyanate group; (2) a direct reaction of an isocyanate compound having an isocyanate group and an alkoxysilyl group in the molecule with an active hydrogen-containing polymerizable unsaturated compound; or (3) an addition reaction of a compound having a polymerizable unsaturated group and an isocyanate group in the molecules and a mercaptoalkoxysilane or aminosilane compound.

The following methods can be given as examples of the method using a mercaptoalkoxysilane as a raw material.

Method (a):

A method comprising reacting a mercaptoalkoxysilane and a polyisocyanate compound to produce an intermediate which contains an alkoxysilyl group, —S(C=O)NH— bonding group, and isocyanate group in the molecule, and reacting the isocyanate in the intermediate compound and an active hydrogen-containing polymerizable unsaturated compound to combine this unsaturated compound via a urethane group.

Method (b):

A method of reacting a polyisocyanate compound and an active hydrogen-containing polymerizable unsaturated compound to produce an intermediate containing a polymerizable unsaturated group, urethane bond group, and isocyanate group in the molecule, and reacting this intermediate with a mercaptoalkoxysilane to combine the mercaptoalkoxysilane via a —S(C=O)NH— group.

In above-mentioned method (a) or (b), a linear, cyclic, or branched compound having two or more active hydrogen atoms which is reactive with an isocyanate by an addition reaction in the molecule can be used additionally. Such a compound can extend the length of the chain of the alkoxysilane compound obtained by the reaction with a polyisocyanate compound via a urethane bond.

The compounds having at least one alkoxysilyl group and mercapto group in the molecule can be given as examples of the alkoxysilane which can form the —S(C=O)NH— bond by the reaction with an isocyanate group in the preparation of the compound shown by the above-mentioned formula (1).

Given as examples of such compounds are mercaptoalkoxysilanes such as mercaptopropyltrimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriethoxysilane, mercaptopropyltriphenoxysilane, and mercaptopropyltributoxysilane. Of these, preferable compounds are mercaptopropyltrimethoxysilane and mercaptopropyltriethoxysilane. As an example of commercially available mercaptoalkoxysilane, SH6062 manufactured by Dow Corning Toray Silicone Co., Ltd. can be given. These mercaptoalkoxysilanes can be used either individually or in combinations of two or more. As other mercaptoalkoxysilanes, an addition product of an amino substituted alkoxysilane and epoxy group substituted mercaptan, an addition product of an epoxy silane and α,ω-dimercapto compound, and the like can be given.

The isocyanate compound used for preparing the organosilicon compounds can be selected from the compounds having a linear saturated hydrocarbon, cyclic saturated hydrocarbon, or aromatic hydrocarbon structure. Such isocyanate compounds can be used either individually or in combinations of two or more. The number of isocyanate groups in a molecule is usually from 1 to 30, and preferably from 2 to 10. If more than 30, the viscosity of the products increases, resulting in lowered processability.

Given as examples of such a isocyanate compound are linear hydrocarbon isocyanate compounds such as 3-trimethoxysilylpropane isocyanate, 3-triethoxysilylpropane isocyanate, 3-methacryloxypropyl isocyanate, tetramethylene diisocyanate, hexamethylene diisocyanate, and 2,2,4-trimethylhexamethylene diisocyanate; cyclic saturated hydrocarbon isocyanate compounds such as isophorone diisocyanate, dicyclohexylmethane diisocyanate, methylenebis (4-cyclohexylisocyanate), hydrogenated diphenylmethane diisocyanate, hydrogenated xylene diisocyanate, hydrogenated toluene diisocyanate, and 1,3-bis(isocyanatemethyl) cyclohexane, and aromatic hydrocarbon isocyanate compounds such as 2,4-tolylene diisocyanate, 2,6-tolylene diisocyanate, 1,3-xylylene diisocyanate, 1,4-xylylene diisocyanate, p-phenylene diisocyanate, 3,3'-dimethyl-4,4'-diphenylmethane diisocyanate, diphenylmethane-4,4'-diisocyanate, 4,4'-biphenylene diisocyanate, 6-isopropyl-1,3-phenyl diisocyanate, 4-diphenylpropane diisocyanate, lysine diisocyanate, 1,5-naphthalene diisocyanate, and polyisocyanates of polydiphenylmethane.

Among these, preferable compounds are cyclic saturated hydrocarbon polyisocyanate compounds and aromatic hydrocarbon polyisocyanate compounds, and more preferable compounds are cyclic saturated hydrocarbon polyisocyanate compounds. Specific examples of particularly preferred polyisocyanate compounds are 3-trimethoxysilylpropane isocyanate, 3-triethoxysilylpropane isocyanate, isophorone diisocyanate, hydrogenated xylene diisocyanate, and hydrogenated toluene diisocyanate. Given as examples of commercially available polyisocyanate compounds are A-1310 and Y-5187 manufactured by Nippon Unicar Co., Ltd.; Calenz MOI manufactured by Showa Denko Co., Ltd.; TDI-80/20, TDI-100, MDI-CR100, MDI-CR300, MDI-PH, and NDI manufactured by Mitsui-Xisso Urethane Co., Ltd.; Coronate T, Millionate MT, Millionate MR, and HDI manufactured by Nippon Polyurethane Industry Co., Ltd.; and Takenate 600 manufactured by Takeda Chemical Industries Co., Ltd.

The amount of these polyisocyanate compounds used in the above-mentioned method (a) is determined so that the ratio of the isocyanate group for one equivalent of the mercapto group in the mercaptoalkoxysilane is in the range from 0.1 to 100 equivalent, preferably from 0.5 to 10 equivalent, and more preferably from 0.9 to 1.2 equivalent. If the amount of the polyisocyanate compounds in terms of the equivalence of isocyanate group is less than 0.1, 0.9 equivalent of mercaptosilane may be left unreacted, giving rise to insufficient abrasion resistance of coating films. The use of polyisocyanate compounds in excess of 100 equivalent of isocyante group may leave a large amount of the isocyanate groups unreacted, resulting in the composition with lowered weather resistance.

In the above-mentioned method (b), on the other hand, the amount of the polyisocyanate compounds in terms of the equivalenct of isocyanate group is in the range from 0.1 to 100, preferably from 0.5 to 10, and more preferably from 0.9 to 1.2, for one equivalent of the active hydrogen contained in active hydrogen-containing polymerizable unsaturated compounds.

In either the method (a) or method (b), a catalyst can be added to shorten the reaction time. Either a basic catalyst or acid catalyst can be used as the catalyst. As examples of the basic catalyst, amines such as pyridine, pyrrole, triethylamine, diethylamine, dibutylamine, and ammonia; phosphines such as tributyl phosphine and triphenyl phosphine; and the like can be given. Among these, tertiary amines such as pyridine and triethylamine are desirable. As acid catalysts, metal alkoxides such as copper naphthenate, cobalt naphthenate, zinc naphthenate, 1,4-diazabicyclo[2,2,2]octane (DABCO), methyl DABCO, tributoxy aluminum, trititanium tetrabotoxide, and zirconium tetrabotoxide; Lewis acids such as trifluoroboron diethyl etherate and aluminium chloride; tin compounds such as tin 2-ethylhexanoate, octyl tin trilaurate, dibutyl tin dilaurate, octyl tin diacetate, and the like can be given. Among these, acid catalysts are preferred, and tin compounds are particularly preferred. Specific examples of particularly preferred tin compounds are octyl tin trilaurate, dibutyl tin dilaurate, octyl tin diacetate, and the like. The amount of these catalysts to be added is from 0.01 to 5 parts by weight, and preferably from 0.1 to 1 part by weight, for 100 parts by weights of polyisocyanate compounds. Effect of decrease in the reaction time is slight if the amount of the catalyst added is less than 0.01 part by weight. On the other hand, when the amount of the catalyst is more than 5 parts by weight, storage stability of the product may be impaired.

As examples of the active hydrogen-containing polymerizable unsaturated compound which can bind with the above-mentioned polyisocyanate compound through a urethane bond by the addition reaction in the preparation of the organosilicon compound, the compounds having at least one active hydrogen atom which can form a urethane bond by the addition reaction with an izocyanate group and at least one polymerizable unsaturated group in the molecule can be given. These compounds can be used either individually or in combinations of two or more. Carboxylic acid group-containing polymerizable unsaturated compounds and hydroxyl group-containing polymerizable unsaturated compounds are given as such compounds. Specific examples of polymerizable unsaturated compound having a carboxylic acid group include unsaturated aliphatic carboxylic acid such as (meth)acrylic acid, itaconic acid, cinnamic acid, maleic acid, fumaric acid, 2-(meth) acryloxypropyl hexahydrogenphthalate, and 2-(meth)acryloxyethyl hexahydrogenphthalate; and unsaturated aromatic carboxylic acid such as 2-(meth)acryloxypropyl phthalate and 2-(meth) acryloxypropylethyl phthalate. Given as examples of hydroxyl group-containing polymerizable unsaturated compounds are hydroxyl group-containing acrylates, hydroxyl group-containing methacrylates, and hydroxyl group-containing styrenes, such as 2-hydroxyethyl (meth)acrylate, 2-hydroxypropyl (meth)acrylate, 2-hydroxybutyl (meth) acrylate, 2-hydroxy-3-phenyloxypropyl (meth)acrylate, 1,4-butanediol mono(meth)acrylate, 2-hydroxyalkyl (meth) acryloyl phosphate, 4-hydroxycyclohexyl (meth)acrylate, neopentyl glycol mono (meth)acrylate, poly (pentamethyleneoxycarboxylate)ethoxy (meth)acrylate, hydroxy styrene, hydroxy α-methylstyrene hydroxyethyl styrene, hydroxy-terminal polyethylene glycol styryl ether, hydroxy-terminal polypropylene glycol styryl ether, hydroxy-terminal polytetramethylene glycol styryl ether, terminal-hydroxy polyethylene glycol (meth)acrylate, terminal-hydroxy polypropylene glycol (meth)acrylate, terminal-hydroxy poly(tetraethylene glycol (meth)acrylate), trimethylolpropane di(meth)acrylate, trimethylolpropane mono(meth)acrylate, ethlenoxide(EO)-modified trimethylolpropane tri(meth)acrylate, propylene oxide (PO)-modified trimethylolpropane tri(meth)acrylate, pentaerythritol tri(meth)acrylate, pentaerythritol di(meth)acrylate, pentaerythritol mono(meth)acrylate, dipentaerythritol penta (meth)acrylate, dipentaerythritol tetra(meth)acrylate, dipentaerythritol tri(meth)acrylate, dipentaerythritol di(meth) acrylate, and dipentaerythritol mono(meth)acrylate.

Among these, unsaturated aliphatic carboxylic acids and hydroxyl group-containing acrylate compounds are preferred, with the hydroxyl group-containing acrylate compounds, such as, for example, 2-hydroxylethyl acrylate, 2-hydroxypropyl acrylate, pentaerythritol triacylate, and dipentaerythritol pentacrylate being particularly preferred. The amount of these active hydrogen-containing polymerizable unsaturated compound in terms of equivalent of the active hydrogen is one equivalent or more for one equivalent of isocyanate group remaining in the intermediate compound which is produced by the addition reaction of a mercapto alkoxysilane and a polyisocyanate compound. If less than one equivalent, the resulting composition may exhibit undesirable effects such as foaming, viscosity increase, and coloring due to the reaction of reactive isocyanate groups remaining in the alkoxysilyl compound and moisture.

In the preparation of the organosilicon compound, with an objective of improving flexibility of coating films and increasing adhesion with substrates, a divalent organic group may be introduced by the addition reaction of a polyisocyanate compound between the alkoxysilyl group and the polymerizable unsaturated group. As the organic compound which reacts with the isocyanate group by the addition reaction, a linear, cyclic, or branched organic compound having two or more active hydrogen atoms in the molecule can be used. Here, as examples of the group having active hydrogen atoms, a hydroxyl group, carboxyl group, mercapto group, amino group, sulfonic group, phosphoric acid group, silanol group, and the like can be given. These organic compounds have two or more, preferably from 2 to 10, and more preferably 2, active hydrogen atoms in the molecule. The molecular weight of the compound having active hydrogen atoms is preferably from 50 to 100,000, more preferably from 100 to 50,000, and particularly preferably from 500 to 10,000. As examples of such a divalent organic compound, polyalkylene glycols, polyalkylene thioglycols, polyester diols, polyamides, polycarbonate diols, polyalkylene diamines, polyalkylene dicarboxylic acids, polyalkylene diols, and polyalkylene dimercaptans can be given. Among these, polyalkylene glycols are preferred. As examples of commercially available polyalkylene glycols, polyethylene glycol, polypropylene glycol, polytetraethylene glycol, polyhexamethylene glycol, and copolymers of two or more of these polyalkylene glycols can be given. Given as commercially available products are UNISAFE DC1100, UNISAFE DC1800, UNISAFE DCB1100, UNISAFE DCB 1800 manufactured by Nippon Oil and Fats Co. Ltd., PPTG 4000, PPTG 2000, PPTG 1000, PTG 2000, PTG 3000, PTG 650, PTGL 2000, PTGL 1000 manufactured by Hodogaya Chemical CO., Ltd., and EXCENOL 1020 manufactured by Asahi Glass Co, Ltd., PBG 3000, PBG 2000, PBG 1000, Z3001 manufactured by Daiichi Kogyo Seiyaku Co., Ltd. The methods for preparing the polymerizable unsaturated group-containing alkoxysilane containing the above-mentioned divalent organic groups as the constituents will now be described taking polyalkylene glycol as an example of the divalent organic groups.

Method (c):

A method comprising adding a polyalkylene glycol to the addition compound of a mercapto alkoxysilane having a reactive isocyanate group at the terminal thereof and a polyisocyanate compound to convert the terminal hydroxyl group into an alkoxysilane group, and reacting the resulting compound with a separately prepared addition compound of the polymerizable unsaturated compound having a hydroxyl group at the terminal thereof and a polyisocyanate compound to combine them via a urethane bond.

Method (d):

A method of preparing an addition compound of a mercapto alkoxysilane having a reactive isocyanate group at the terminal thereof and a polyisocyanate compound, and reacting this addition compound with a separately prepared another addition compound of a polyalkylene glycol polyisocyanate compound having a reactive hydroxyl group at the terminal thereof and a hydroxyl group-containing polymerizable unsaturated compound, to combine these compounds via a urethane bond.

The conditions for forming the urethane bonds in the method (c) or method (d) are the same as the conditions used in the above-mentioned method (a) or (b). The equivalent ratio of the compound having a hydroxyl group at the terminal to the compound having a reactive isocyanate group at the terminal taking part in the bonding is in the range preferably from 1.0 to 1.2. If less than 1.0, coloring and viscosity increase due to unreacted isocyanate group tend to occur.

Moreover, a co-hydrolyzate with other organic alkoxysilane may be used as the hydrolyzate of a polymerizable unsaturated group-modified alkoxysilane in the preparation of the alkoxysilane compound. For example, a co-condensation product with other organic alkoxysilane such as an alkyl alkoxysilane, e.g. tetramethoxysilane, tetraethoxysilane, tetrabutoxysilane, methyltrimethoxysilane, methyltriethoxysilane, dimethyldimethoxysilane, phenyltrimethoxysilane, and the like may be used. When preparing the hydrolyzate, the amount of water used for the hydrolysis is usually from 0.5 to 1.5 equivalent for the amount of the total alkoxy group. A hydrolysis-condensation polymer can be obtained by stirring the reaction mixture for 5 minutes to 24 hours in the presence or absence of solvent, while heating at a temperature from 0 to the boiling point of the components. In this instance, an acid catalyst or base catalyst can be used to decrease the reaction time. The metal oxide particles used for preparing the component (B) are in the form of fine particles or a solvent dispersed sol. As a metal oxide, antimony oxide, zinc oxide, tin oxide, indium-tin mixed oxide, cerium oxide, aluminum oxide, titanium dioxide, and zirconium oxide can be given as examples. These may be used either individually or in combinations of two or more. In addition, from the viewpoint of ensuring mutual solubility and dispersibility with the component A and mutual solubility with photo-initiators and photosensitizers, a sol in a polar solvent such as alcohol, dimethylformamide, dimethylacetamide, or cellosolve may be used rather than water sol. As particularly preferred sols, sols of antimony oxide, zinc oxide, cerium oxide, and zirconium oxide can be given.

The average diameter of metal oxide particles is, for example, from 0.001 to 2 $\mu$m. Such metal oxide particles can be commercially available under the tradenames such as Alumina Sol-100, -200, -520 (alumina powder dispersed in water, manufactured by Nissan Chemical Industries, Ltd.), Celnax (zinc antimonate powder dispersed in water, manufactured by Nissan Chemical Industries, Ltd.), Nanotek (alumina, titanium oxide, tin oxide, indium oxide, and zinc oxide powders dispersed in a solvent, manufactured by CI Chemical Co., Ltd.), Titania Sol, SN-100D (a sol of antimony dope tin oxide powder dispersed in water, manufactured by Ishihara Sangyo Kaisha, Ltd.), ITO powder (manufactured by Mitsubishi Material Co., Ltd.), Needral (cerium oxide powder dispersed in water, manufactured by Taki Chemical Co., Ltd.), and the like. To prepare transparent films using the composition of the present invention, a preferable particle diameter as an the range from 0.001 to 2 $\mu$m, and more preferably from 0.001 to 0.05 $\mu$m. The form of metal oxide particles may be spherical, hollow, porous, rod-like, plate-like, fibrous, or amorphous, and preferably spherical. The specific surface area of metal oxide particles is preferably from 10 to 3,000 $m^2/g$, and more preferably from 20 to 1,500 $m^2/g$. These metal oxide particles can be used as dry powder or as a dispersion in water or an organic solvent. Dispersions of fine particles of metal oxide well known in the art as solvent dispersion sols of metal oxide, for example, can be used as they are. The use of a solvent dispersion sol of metal oxide is particularly desirable to ensure transparency. Organic solvents which can be used as a dispersion medium for metal oxide include methanol, isopropyl alcohol, ethylene glycol, butanol, ethylene glycol monopropyl ether, methyl ethyl ketone, methyl isobutyl ketone, toluene, xylene, dimethylformamide, and other solvents which are mutually soluble with these organic solvent, as well as mixtures of these organic solvents and water.

Preferable solvents are methanol, isopropyl alcohol, methyl ethyl ketone, xylene, and toluene.

The amount of alkoxysilane compound immobilized on the component (B) can be determined by measuring weight reduction (%) of the compound when fine dry particles are completely burnt in the air by a thermogravimetric analysis usually from room-temperature to 800.

The amount of water which is consumed by the hydrolysis of alkoxysilane compounds in the preparation of the component (B) may be equivalent to the amount of water to hydrolyze at least one alkoxy group on a silicon atom in the molecule. The amount of water to be added or present during the hydrolysis reaction is preferably ⅓ or more, and more preferably from ½ to 3 times, for the number of mols of the total alkoxy group on the silicon atoms. Only a product with the alkoxysilane compound physically adsorbed on the surface of the metal oxide particles can be obtained by merely blending the alkoxysilane compound of the above-mentioned formula (1) and metal oxide particles under the conditions where there is completely no water. The affect of increasing abrasion resistance which is one of the objectives of the composition of the present invention cannot be exhibited using such materials as the component (B).

The following methods can be used for preparing the component (B) of the present invention: a method comprising hydrolyzing the alkoxysilane compound of the above-mentioned formula (1), mixing the hydrolyzate with fine particles of metal oxide in the form of powder or a solvent dispersion sol, and stirring the mixture with heating; a method of hydrolyzing the alkoxysilane compound of the above-mentioned formula (1) in the presence of the metal oxide particles; a method of treating the surface of the metal oxide particles in the presence of other components such as poly-functional unsaturated organic compounds, monofunctional unsaturated organic compounds, and photopolymerization initiators; and the like. Among these methods, a method of hydrolyzing the alkoxysilane compounds shown by the above-mentioned formula (1) in the presence of metal oxide particles is preferred. In the preparation of the component (B), a temperature from 20 to 150 and the treating time in the range from 5 minutes to 24 hours are applied.

The metal oxide particles are known to contain moisture on the surface of the particles as adsorbed water during normal storage conditions. Therefore, it is possible to utilize the water contained in the raw material in the preparation of the component (B) by mixing the alkoxysilane compound and metal oxide particles and stirring the mixture while heating.

When a powder of metal oxide fine particles is used in the preparation of the component (B) of the present invention, an organic solvent which is mutually soluble with water may be added to carry out the reaction of the powder of metal oxide fine particles with the alkoxysilane compound homogeneous and smoothly. As preferable examples of such an organic solvent, alcohols, ketones, ethers, and amides can be given. Given as specific examples are alcohols such as methanol, ethanol, isopropyl alcohol, butanol, ethylene glycol monomethyl ether, and ethylene glycol monobutyl ether; ketones such as acetone, methyl ethyl ketone, and methyl isobutyl ketone; amides such as dimethylformamide, dimethylacetamide, N-methylpyrrolidone, λ-butyrolactone; and the like can be given. The amount of these solvents to be added is not specifically restricted inasmuch as such an amount conforms to the objective of carrying out the reaction smoothly and homogeneously.

Moreover, an acid or a base may be added as a catalyst to accelerate the reaction for the preparation of the component (B). As examples of the acid, inorganic acids such as hydrochloric acid, nitric acid, sulfuric acid, and phosphoric acid; organic acids such as methane sulfonic acid, toluene sulfonic acid, phthalic acid, malonic acid, formic acid, acetic acid, and oxalic acid; unsaturated organic acids such as methacrylic acid, acrylic acid, and itaconic acid; and ammonium salts such as tetramethyl ammonium chloride and tetrabutyl ammonium chloride can be given. As examples of the bass, aqueous ammonia; primary, secondary or tertiary aliphatic amines such as diethylamine, triethylamine, dibutylamine, and cyclohexylamine; aromatic amines such as pyridine; sodium hydroxide, potassium hydroxide, and quaternary ammonium hydroxides such as tetramethylammonium hydroxide and tetrabutylammonium hydroxide can be given. Of these, preferable examples are organic acids and unsaturated organic acids among the acids, and tertiary amines or tertiary ammonium hydroxides among the bases. The amount of these acids or bases to be added is preferably from 0.001 to 1.0 part by weight, and more preferably from 0.01 to 0.1 part by weight, for 100 part by weight of the alkoxysilane compounds. Any compounds which decompose upon irradiation of radioactive rays and initiate the polymerization can be used as the radiation polymerization initiator of the component (C) in the present invention. A photosensitizers may be added as required. The words "radiation" as used in the present invention include infrared rays, visible rays, ultraviolet rays, deep ultraviolet rays, X-rays, electron beams, α-rays, β-rays, γ-rays, and the like.

Given as specific examples of the above-mentioned radiation polymerization initiators are acetophenone, acetophenone benzyl ketal, anthraquinone, 1-hydroxycyclohexylphenyl ketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, xanthone, 1,1-dimethoxydeoxybenzoin, 3,3'-dimethyl-4-methoxybenzophenone, thioxanethone compounds, diethylthioxanthone, 2-isopropylthioxanthone, 2-chlorothioxanthone, 1-(4-dodecylphenyl)-2-hydroxy-2-methylpropan-1-one, 2-methyl-1-[4-(methylthio)phenyl]-2-morpholino-propan-1-one, triphenylamine, 2,4,6-trimethylbenzoyldiphenylphosphineoxide, bis- (2,6-dimethoxybenzoyl)-2,4,4-trimethylpentylphosphine oxide, bisacylphosphineoxide, benzyl dimethyl ketal, fluorenone, fluorene, benzaldehyde, benzoin ethyl ether, benzoin propyl ether, benzophenone, Michler's ketone, 2-benzyl-2-dimethylamino-1- (4-morpholinophenyl)-butan-1-one, 3-methylacetophenone, and 3,3',4,4'-tetra(t-butylperoxycarbonyl)benzophenone (BTTB). Combinations of BTTB and a coloring matter photosensitizer such as xanthene, thioxanthene, cumarin, or ketocumarin can also be given as specific examples of the initiator. Of these, benzyl dimethyl ketal, 1-hydroxycyclohexyl phenyl ketone, 2,4,6-trimethybenzoyl diphenylphosphine oxide, bis-(2,6-dimethoxybenzoyl)-2,4,4-trimethylpentyl phosphine oxide, 2-benzyl-2-dimethylamino-1-(4-morpholinophenyl)-butan-1-one, and the like are particularly preferred.

As examples of commercially available products of photoinitiators, Irgacure 184, 651, 500, 907, 369, 784, 2959, Darocur 1116, 1173 (manufactured by Ciba Specialty Chemicals Co., Ltd.), Lucirine TPO (manufactured by BASF), Ubecryl P36 (manufactured by UCB), and Escacure KIP150, KIP100F (manufactured by Lamberti) can be given.

As examples of photosensitizers, triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate, as well as commercially available products such as Ubecryl P102, 103, 104, 105 (manufactured by UCB), and the like can be given.

The Proportion of the photoinitiators used as the component (c) in the composition of the present invention is in the range preferably from 0.01 to 10 wt %, more preferably from 0.5 to 7 wt %, and particularly preferably from 1 to 5 wt %. If more than 10 wt %, storage stability or the composition and properties of the cured products may be adversely affected. If less than 0.01 part by weight, on the other hand, a cure speed may be retarded.

Polymerizable monomers having a vinyl group or (meth) acryloyl group other than the above-mentioned component (A) can be used in the present invention as optional components. Such polymerizable monomers may be either mono-functional monomers or poly-functional monomers.

Given as examples of mono-functional monomers are vinyl group-containing monomers such as N-vinyl caprolactam, N-vinyl pyrrolidone, N-vinylcarbazole, and vinylpyridine; acrylamide, acryloyl morpholine, 7-amino-3, 7-dimethyloctyl (meth)acrylate, isobutoxymethy (meth) acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide, tetrachlorophenyl(meth) acrylate, 2-tetrachlorophenoxyethyl (meth)acrylate, tetrahydrofurfuryl (meth)acrylate, tetrabromophenyl (meth) acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth) acrylate, phenoxyethyl (meth)acrylate, butoxyethyl (meth) acrylate, pentachlorophenyl (meth)acrylate, pentabromophenyl (meth)acrylate, polyethylene glycol mono(math) acrylate, polypropylene glycol mono(meth)acrylate, bornyl (meth)acrylate, and methyltriethylene diglycol (meth) acrylate.

Of these, N-vinyl caprolactam, N-vinyl pyrrolidone, acryloyl morpholine, N-vinylcarbazole, isobornyl (meth) acrylate, phenoxyethyl (meth)acrylate, and the like are preferred, with N-vinyl caprolactam, N-vinyl pyrrolidone, and acryloyl morpholine being particularly preferred. The most preferred monofunctional polymerizable monomer is acryloyl morpholine.

As examples of commercially available products of these mono-functional monomers, Aronix M-111, M-113, M-117 (manufactured by Toagosei Co., Ltd.), Kayarad TC110S, R-629, R-644 (manufactured by Nippon Kayaku Co, Ltd), Viscoat 3700 (manufactured by Osaka Organic Chemical Industry Co., Ltd). and the like can be given.

Given as examples of poly-functional monomers are (meth)acryloyl group-containing monomers such as ethylene glycol di(meth)acrylate, dicyclopentenyl di(meth) acrylate, triethylene glycol diacrylate, tetraethylene glycol di(meth)acrylate, tricyclodecanediyldimethylene di(meth) acrylate, tripropylene diacrylate, neopentyl glycol di(meth) acrylate, both terminal (meth)acrylate of ethylene oxide addition bisphenol A, both terminal (meth)acrylate of propylene oxide addition bisphenol A, both terminal (meth) acrylate of ethylene oxide addition tetrabromobisphenol A, both terminal (meth)acrylate of propylene oxide addition tetrabromobisphenol A, bisphenol A diglycidyl ether, both terminal (meth)acrylate of tetrabromobisphenol A diglycidyl ether, 1,4-butanediol di(meth)acrylate, 1,6-hexanediol di(meth)acrylate, polyester di(meth)acrylate, and polyethylene glycol di(meth)acrylate.

Of these, both terminal (meth)acrylate of ethylene oxide addition bisphenol A, both terminal (meth)acrylate of propylene oxide addition bisphenol A, tricyclodecanediyldimethylene di(meth)acrylate, tetraethylene glycol di(meth) acrylate, tripropylene glycol di(meth)acrylate, neopentyl glycol di(meth)acrylate, and polyethylene glycol di(meth) acrylate are preferred.

As commercially available products of poly-functional monomers, Yupimer UV, SA1002 (manufactured by Mitsubishi Chemical Corp.), Viscoat 700 (manufactured by Osaka Organic Chemical Industry Co., Ltd.), Kayarad R-604 (manufactured by Nippon Kayaku Co., Ltd.), Aronix M-210 (manufactured by Toagosei Co., Ltd.), and the like can be used.

In addition to the above-described components, various additives can be optionally added to the composition of the present invention. Given as examples of such additives are antioxidants, UV absorbers, light stabilizers, silane coupling agents, antioxidants, thermal polymerization inhibitors, coloring agents, leveling agents, surfactants, preservatives, plasticizers, lubricants, solvents, inorganic fillers, organic fillers, wettability improvers, coating surface improvers, and the like. As commercially available products of antioxidants Irganox 1010, 1035, 1076, 1222 (manufactured by Ciba Specialty Chemicals Co.), and the like can be given. As commercially available products of UV absorbers, Tinuvin P, 234, 320, 326, 327, 328, 213, 400 (manufactured by Ciba Specialty Chemicals Co.), Sumisorb 110, 130, 140, 220, 250, 300, 320, 340, 350, 400 (manufactured by Sumitomo Chemical Industries Co., Ltd.), and the like are given. As commercially available products of light stabilizers, Tinuvin 292, 144, 622LD (manufactured by Ciba Specialty Chemicals Co.), Sanol LS-770, 765, 292, 2626, 1114, 744 (manufactured by Sankyo Chemical Co.), and the like can be given. As silane coupling agents, γ-aminopropyl triethoxysilane, γ-mercaptopropyltrimethoxysilane, γ-methacryloxypropyltrimethoxysilane, and commercially available products such as SHG6062, SZ6030 (manufactured by Dow Corning Toray Silicone Co., Ltd.), KBE903, KBM803 (manufactured by Shin-Etsu Silicone Co., Ltd.), and the like can be given. As commercially available products of aging preventives, Antigene W, S, P, 3C, 6C, RD-G, FP, AW (manufactured by Sumitomo Chemical Industries Co., Ltd.), and the like can be given. Polymers or oligomers such as epoxy resins, polymerizable compounds (such as urethane (meth)acrylate, vinyl ether, propenyl ether, maleic acid derivatives), polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomers, silicon-containing oligomers, polysulfide-type oligomers can also be incorporated in the composition of the present invention as other additives.

The radiation curable resin composition of the present invention can produce cured products with excellent characteristics such as a high refractive index, superior abrasion resistance, transparency, chemical resistance, and the like. The composition is thus suitable for use as a hard coat for plastic optical parts, touch panels, and film-type liquid crystal elements, and fabricated plastic materials, and also as a stain-proof or mar-proof coating material for floors and walls inside buildings. In addition, because the composition does not produce interference fringes when applied to a substrate with a similar refractive index due to its high refractive index, the composition can be used suitably in optical applications. When the radiation curable resin composition of the present invention is cured, cured products with pencil hardness from H to 9 H at 23 can be obtained. The rate of shrinkage upon curing is usually 10% or less,, and preferably 6% or less. As mentioned above, the resulting cured products has a high refractive index, excellent abrasion resistance, transparency, chemical resistance, and the like. The cured products has preferably a refractive index of 1.55 or more and light transmittance of 98% or more. Also, preferably an about 5 μm thick layer of the composition, after cure, will have a light transmittance of at least 90%, and, after the Taber's abrasion test that is set forth in this application, haze value of less than 40%. Therefore, the composition can be suitably used for plastic sheets, plastic films, and the like requiring transparency, and particularly as materials for optical use. Other application of the composition includes cathode-ray tubes and front panels such as a flat display, laser display, photochromic display, electrochromic display, liquid crystal display, plasma display, light emitting diode display, and electroluminescent panel, as well as parts for input equipment of these front panels. Other application includes front covers such as an enclosure case, lens for optical instrument, eye glass lens, window shield, light cover, helmet shield, and the like. In addition, when a coating with a high refractive index is used as an optical material, it is desirable to provide a coating with a low refractive index to prevent reflection.

EXAMPLES

The present invention will now be described in more detail by way of examples which should not be construed as limiting the present invention. In the following examples, unless otherwise indicated, "parts" and "%" means respectively "parts by weight" and "wt %".

Preparation of Alkoxysilane Compound

Reference Example 1

20.6 parts of isophorone diisocyanate was added dropwise to a solution consisting of 7.8 parts of mercaptopropyl trimethoxysilane and 0.2 part of dibutyl tin dilaurate over one hour while stirring in dry air at 50. After stirring for a further 3 hours at 60, 71.4 parts of pentaerythritol triacylate was added dropwise over one hour at 30. The mixture was stirred for an additional 3 hours with heating at 60 to obtain a compound having a polymerizable unsaturated group and alkoxysilane group in the molecule. This compound is herein designated as "silane compound X". The amount of residual isocyanate group in the product was analyzed. It was confirmed that the amount of residual isocyanate group was 0.1% or less, indicating that the reaction wag completed almost quantitatively.

Preparation of the Component (B)

Reference Example 2

A mixture of 8.1 parts of the silane compound X prepared in Reference Example 1, 90.5 parts of zirconium oxide sol in methyl ethyl ketone solvent (number average particle diameter: 0.01 μm, zirconium oxide concentration: 30%), and 0.1 part of ion exchanged water was stirred for three hours at 60. After the addition of 1.3 parts of methyl orthoformate and 41.2 parts of methyl ethyl ketone, the mixture was stirred for a further one hour while heating at the same temperature to obtain a dispersion liquid of the reaction product of the compound having a polymerizable unsaturated group and alkoxysilane group in the molecule and particles of zirconium. This dispersion liquid is herein designated as "dispersion b1".

Reference Example 3

A mixture of 8.1 parts or the silane compound X prepared in Reference Example 1, 90.5 parts of antimony pentoxide sol in methyl ethyl ketone solvent (number average particle diameter; 0.05 μm, antimony pentoxide concentration: 30%), and 0.1 part of ion exchange water was stirred for three hours at 60. After the addition of 1.3 parts of methyl ortho-formate and 41.2 parts of methyl ethyl ketone, the mixture was stirred for a further one hour while heating at the same temperature to obtain a dispersion liquid of the reaction product of the compound having a polymerizable unsaturated group and alkoxysilane group in the molecule and particles of antimony pentoxide. This dispersion liquid is herein designated as "dispersion b2". A solid content (%) of this dispersion liquid was 25%.

Reference Example 4

A mixture of 8.1 parts of the silane compound x prepared in Reference Example 1, 100 parts of alumina sol in methanol (number average particle diameter: 0.0075 μm solid content: 30%, water content: 5.6%), and 0.01 part of p-methoxy phenol was stirred for three hours at 60. After the addition of 1.3 parts of methyl orthoformate and 41.2 parts of methanol, the mixture was stirred for a further one hour while heating at the same temperature to obtain a dispersion liquid of the reaction product of the compound having a polymerizable unsaturated group and alkoxysilane group in the molecule and alumina particles. This dispersion liquid is herein designated as "dispersion b3". A solid content (%) of this dispersion liquid was 25%.

Preparation of Compositions

Preparation of the composition used in the present invention will now be described. The ratio by weight of each component is shown in Table 1.

Example 1

80 parts of the dispersion liquid b1 prepared in Reference Example 2 as the component (B), 20 parts of dipentaerythritol hexacrylate as the component (A). 1.2 parts of 1-hydroxycyclohexyl phenyl ketone and 0.8 parts of 2-methyl-1-[4-(methylthio)phenyl]-2-morpholinopropan-1-one as the component (C) were placed in a container shielded from ultraviolet rays and the mixture was stirred for 30 minutes at room-temperature to obtain the composition shown in Table 1 as a homogeneous solution. The compositions for Example 2–5 and Comparative Examples 1–3 shown in Table 1 were prepared in the same manner. The compositions of Examples 1 and 3 correspond to the compositions of Comparative Examples 2 and 3 respectively. The compositions of Examples 2 and 4 and Comparative Example 1 contain a large amount of the component (B) to increase the refractive index.

TABLE 1

| | Parts (parts of solid components) | | | | | | | |
|---|---|---|---|---|---|---|---|---|
| | Example | | | | | Comparative Example | | |
| | 1 | 2 | 3 | 4 | 5 | 1 | 2 | 3 |
| Component (A) | | | | | | | | |
| Unsaturated organic compound (Dipentaerythritol hexacrylate) | 20 | 8 | 20 | 12 | 12 | | 20 | 20 |
| Metal oxide sol solution without silane treatment | | | | | | | | |
| Zirconia sol | | | | | | 80 (20) | | |
| Antimony oxide sol | | | | | | | | 80 (20) |
| Component (B) | | | | | | | | |
| Metal oxide sol solution with silane treatment | | | | | | | | |
| b1 | 80 (20) | 92 (32) | | | | | | |
| | | | | | | 100 (40) | | |
| b2 | | | 80 (20) | 88 (28) | | | | |
| b3 | | | | | 80 (20) | | | |
| Component (C) | | | | | | | | |
| *1-hydroxycyclohexyl phenyl ketone | 1.2 | 1.2 | 1.2 | 1.2 | 1.2 | 1.2 | 1.2 | 1.2 |
| *2-methyl-1-[4-(methylthio)phenyl]-2-morpholinopropan-1-one | 0.8 | 0.8 | 0.8 | 0.8 | 0.8 | 0.8 | 0.8 | 0.8 |
| Total | 102 | 102 | 102 | 102 | 94 | 102 | 102 | 102 |
| Solid components (%) | 41 | 41 | 41 | 41 | 36 | 41 | 41 | 41 |
| Metal oxide in the solid components (wt %) | 38 | 61 | 38 | 53 | 46 | 76 | 50 | 50 |

Test Examples

Test specimens were prepared using the resin compositions prepared in the above Examples and Comparative Examples to evaluate pencil hardness, mar resistance, abrasion resistance, adhesion to substrates, transmittance, and refractive index of the cure films according to the following methods. The results are shown in Table 2.

Preparation of Test Specimens

The resin compositions prepared in the above Examples and Comparative Examples were applied on a commercially available PET film (thickness: 188 μm) using a wire bar coater (No. 10) to a thickness of about 5 μm. The coatings were allowed to stand for one minute in an infrared dryer oven at 40, followed by irradiation with ultraviolet rays at a dose of 0.3 J/cm² in the air to obtain cured coating films. The cured films were then allowed to stand at 23 and relative humidity of 50% for 24 hours to obtain test specimens.

Appearance

The appearance was evaluated by naked eye observation.

Light Transmittance

Light transmittance at a wavelength of 500 nm was measured using a spectrophotometer and corrected for reflectance and transmittance of the substrates.

Refractive Index

The refractive index was measured by Abbe's refractometer.

Pencil Hardness

The pencil hardness was measured according to JIS K5400 using a pencil scratch tester.

Abrasive Resistance

A haze value (H) after the Taber's abrasion test (abrasive wheel CS-10F, load 500 g, rotation 100) was measured using a Taber's abrasion tester according to JIS R3221.

Substrate Adhesion

JIS K5400 was followed, 100 squares (1 mm×1 mm) were produced on the surface of the cured test specimen by 11×11 cross-cut lines. A commercially available cellophane tape was adhered and rapidly peeled off. The substrate adhesion was indicated by X/100, wherein X is the number of squares left on the substrate without being detached.

TABLE 2

|  | Example | | | | | Comparative Example | | |
| --- | --- | --- | --- | --- | --- | --- | --- | --- |
|  | 1 | 2 | 3 | 4 | 5 | 1 | 2 | 3 |
| Appearance | Transparent | Transparent | Transparent | Transparent | Transparent | Transparent | Semi-transparent | Opaque |
| Light transmittance (/%) | 99 | 99 | 100 | 100 | 97 | 100 | 89 | 63 |
| Refractive index | 1.595 | 1.645 | 1.555 | 1.566 | 1.560 | 1.585 | 1.641 | — |
| Pencil hardness | 3H | 2H | 3H | 2H | 3H | H | 3H | 3H |
| Haze value of coating film (%) | 0.5 | 0.6 | 0.5 | 0.5 | 0.6 | 0.6 | 4.4 | 6.8 |
| Taber's test * | 28 | 22 | 28 | 31 | 8 | 49 | 27 | 46 |
| Adhesion ** | 100 | 100 | 100 | 100 | 100 | 100 | 100 | 100 |

\* Haze value (%)
\*\* Number of cross-cut squares (%) after cellophane tape detachment.

Effect of the Invention

The radiation curable resin composition of the present invention can produce cured products with excellent characteristics such as a high refractive index, superior abrasion resistance, transparency, chemical resistance, and the like. The composition is thus suitable for use as a hard coat for plastic optical parts, touch panels, and film-type liquid crystal elements, and fabricated plastic materials, and also as a stain-proof or mar-proof coating material for floors and walls inside buildings. In addition, because the composition does not produce reflection interference stripes when applied to a substrate with a similar refractive index due to its high refractive index, the composition can be used suitably in optical applications.

What is claimed is:

1. A radiation-curable metal particle comprising a (meth) acrylic compound linked by a silyl group to a metal.

2. The particle according to claim 1, wherein said metal is selected from the group consisting of zirconium, titanium, antimony, zinc, tin, indium, cerium and aluminium.

3. The particle according to claim 1, wherein the silyl group is a substituted silyl group which comprises an alkoxy group, a urethane group and/or a thiourethane group.

4. The particle according to claim 1, wherein said particle is obtainable by reacting an organosilicon compound with a metal oxide.

5. The particle according to claim 1, wherein the particle has a diameter of from 0.001 to 2 µm.

6. A method for forming a radiation-curable metal particle according to claim 1, comprising reacting a metal oxide with an organosilicon compound.

7. The method according to claim 6, wherein the metal oxide is reacted with the organosilicon compound in the presence of an acid or a base.

8. A radiation-curable composition comprising:

(A) a (meth)acrylic compound;

(B) radiation-curable metal particles comprising a radiation-curable group linked by a silyl group to a metal; and (C) a radiation polymerization photoinitiator.

9. The composition according to claim 8, wherein said (meth)acrylic compound comprises at least three (meth) acryloyl groups.

10. The composition according to claim 8, wherein an about 5 µm thick layer of the composition, after cure, has a light transmittance of at least 90% and a haze value after the Taber's abrasion test of less than 40%.

11. A product formed from curing the composition according to claim 8, wherein said product has a refractive index of at least 1.55 and a light transmittance of at least 95%.

12. The product according to claim 11, wherein said products is a coating.

13. An anti-reflection article comprising the product according to claim 11.

14. The metal particle of claim 1, wherein said metal is absent silicon metal.

15. The metal particle of claim 8, wherein said metal is absent silicon metal.

* * * * *